(12) United States Patent
Feron et al.

(10) Patent No.: US 7,921,596 B2
(45) Date of Patent: Apr. 12, 2011

(54) METHOD FOR REGULATING THE HEAT AND $CO_2$ CONCENTRATION OF THE AIR IN AN ENCLOSED SPACE

(75) Inventors: Paul Hubert Feron, Apeldoorn (NL); Nick Antonius Asbroek, Winterswijk (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 330 days.

(21) Appl. No.: 11/920,363

(22) PCT Filed: May 15, 2006

(86) PCT No.: PCT/NL2006/000248
§ 371 (c)(1),
(2), (4) Date: Jul. 28, 2008

(87) PCT Pub. No.: WO2006/123925
PCT Pub. Date: Nov. 23, 2006

(65) Prior Publication Data
US 2009/0064570 A1    Mar. 12, 2009

(30) Foreign Application Priority Data
May 18, 2005  (EP) .................................... 05076166

(51) Int. Cl.
*A01G 9/18* (2006.01)

(52) U.S. Cl. ........................................ 47/17; 47/58.1 R

(58) Field of Classification Search ......... 47/17, 58.1 R; *A01G 9/18*
See application file for complete search history.

(56) References Cited

U.S. PATENT DOCUMENTS

| 3,613,308 | A | * | 10/1971 | Klein ................................. 47/17 |
| 4,073,089 | A | * | 2/1978 | Maginnes et al. ................. 47/17 |
| 5,713,154 | A | | 2/1998 | Goldstein et al. |
| 6,205,704 | B1 | * | 3/2001 | Schmitz et al. .................... 47/17 |
| 7,478,542 | B2 | * | 1/2009 | Wikstrom et al. .............. 62/606 |

FOREIGN PATENT DOCUMENTS

| AU | 390 053 | 3/1990 |
| DE | 41 26 503 | 2/1992 |
| WO | 97/12511 | 4/1997 |

\* cited by examiner

*Primary Examiner* — Rob Swiatek
*Assistant Examiner* — Kristen C Hayes
(74) *Attorney, Agent, or Firm* — Nixon & Vanderhye P.C.

(57) ABSTRACT

The invention provides a method for regulating the heat and the $CO_2$ concentration of the air in an enclosed space within which plants and/or crops are grown, in which method an oxygen-containing gas and a hydrocarbon-containing gas are alternately passed over a bed of particles that are capable of binding oxygen, wherein the oxygen-containing gas is passed over the bed of particles under conditions whereby the particles are oxidised and heat is released, after which at least part of the heat is provided to the enclosed space, and wherein the hydrocarbon-containing gas is passed over a bed of the oxidised particles so obtained under conditions whereby the oxidised particles are chemically reduced and water and $CO_2$ are formed, after which at least part of the $CO_2$ so obtained is provided to the enclosed space.

13 Claims, No Drawings

METHOD FOR REGULATING THE HEAT AND $CO_2$ CONCENTRATION OF THE AIR IN AN ENCLOSED SPACE

This application is the U.S. national phase of International Application No. PCVNL2006/000248 filed 15 May 2006 which designated the U.S. and claims priority to European Patent Application No. 05076166.7 filed 18 May 2005, the entire contents of each of which are hereby incorporated by reference.

The present invention relates to a method for regulating the heat and the $CO_2$ concentration of the air in an enclosed space within which plants and/or crops are grown.

$CO_2$ is a necessary factor for growing plants and/or crops, because in the presence of light, and while taking up $CO_2$, photosynthesis takes place within the plants and/or crops, so that growth is effected. Conversely, in the dark, no photosynthesis takes place and oxygen is taken up by the plants or crops and $CO_2$ is released. As especially the demand for grown crops increases and the space available for growing crops is usually limited, growth stimulation of crops is of great importance in horticulture under glass. The growth of crops can for instance be stimulated by assimilation lighting and through increase of the $CO_2$ concentration in the space within which the respective crops are grown. The increase of the $CO_2$ concentration in particular is an important feature in crop growing. Normally, the $CO_2$ to be used for this purpose is produced by means of a heating boiler wherein a conventional combustion process is carried out in which $CO_2$ is produced and simultaneously heat is released. The heat so obtained can be used for heating the greenhouse during the periods of time when there is a heat demand within the greenhouse. However, such conventional processes have the drawback that the $CO_2$ production and heat release are coupled, whereas in practice the respective demands for $CO_2$ production and heat release are often decoupled. In this respect it is, for instance, noted that during the day, especially in summer, there will usually be a relatively high demand for $CO_2$; whereas at the same time there will only be a limited heat demand. On the other hand, during the night, especially in winter, there will usually be a relatively high demand for heat, whereas the demand for $CO_2$ will only be limited. Hence, conventional processes do not integrate satisfactorily with the respective demands for $CO_2$ and heat that actually occur in greenhouses. Although, it is possible to capture the produced heat in so-called heat buffers for later use at times that the heat demand is only limited, usually a lot of heat waste occurs. In addition, at times during which there is only a limited demand for $CO_2$, most of the $CO_2$ produced is usually directly emitted to the outside air in the form of flue gases. Therefore, not only waste of heat is often involved, but also the unnecessary production and emission of $CO_2$. It will be clear that in view of the increasingly strict standards with regard to energy consumption and emission of $CO_2$, there is a great need for a more efficient use or a reduction of heat and $CO_2$ produced in greenhouses.

Object of the present invention is to provide a method in which $CO_2$ production and heat release can be regulated in an improved, more efficient manner in greenhouses.

Surprisingly, it has now been found that this can be established when use is made of a bed of particles over which two types of processes can be carried out in an alternating manner.

Accordingly, the present invention relates to a method for regulating the heat and the $CO_2$ concentration of the air in an enclosed space within which plants and/or crops are grown, in which method an oxygen-containing gas and a hydrocarbon-containing gas are alternately passed over a bed of particles that are capable of binding oxygen, wherein the oxygen-containing gas is passed over the bed of particles under conditions whereby the particles are oxidised and heat is released, after which at least part of the heat is provided to the enclosed space, and wherein the hydrocarbon-containing gas is passed over a bed of the oxidised particles so obtained under conditions whereby the oxidised particles are chemically reduced and water and $CO_2$ are formed, after which at least part of the $CO_2$ so obtained is provided to the enclosed space.

The method according to the present invention allows for a substantial energy saving whereas simultaneously the emission of $CO_2$ can significantly be decreased. Furthermore, the technology has the ability to produce heat for a certain period of time (depending on the bed size) without having to rely on the supply of hydrocarbon fuel, or the supply of fuel can be reduced or stopped when the peak price of the fuel is high, while later profiting from lower fuel prizes (peak shaving)

In the method according to the present invention, the oxidation and reduction of the particles are preferably carried out in a single reactor, whereby the oxygen-containing gas and hydrocarbon-containing gas are alternately passed over the same bed of particles.

In another attractive embodiment of the present invention, the oxidation and reduction of the particles are carried out in separate reactors that each contain a bed of particles that are capable of binding oxygen, and the oxygen-containing gas and hydrocarbon-containing gas are periodically switched for establishing oxidation and chemical reduction of the particles in each of the beds in the respective reactors.

In a preferred embodiment of the present invention, porous ceramic or metal pipes are used to distribute the oxygen-containing gas and hydrocarbon-containing gas over the bed (s) of particles at a low-pressure drop.

Suitably, the oxidation of the particles takes place at a temperature in the range of from 100 to 1500° C. and a pressure in the range of from 1 to 100 bar. Preferably, the oxidation of the particles takes place at a temperature in the range of from 700 to 1100° C. and a pressure in the range of from 1 to 2 bar.

Suitably, the reduction of the catalyst particles takes place at a temperature in the range of from 300 to 1500° C. and a pressure in the range of from 1 to 100 bar. Preferably, the reduction of the catalyst particles takes place at a temperature in the range of from 600 to 1100° C. and a pressure in the range of from 1 to 40 bar.

The hydrocarbon-containing gas to be used in accordance with the present invention suitably comprises one or more gaseous hydrocarbons.

Preferably, the hydrocarbon-containing gas comprises propane, butane or any hydrocarbon that is gaseous at reactor operating temperature and pressure conditions. More preferably, the hydrocarbon-containing gas comprises natural gas or methane.

The oxygen-containing gas to be used in accordance with the present invention preferably comprises air.

The particles that are capable of binding oxygen suitably comprise a metal or a metal oxide and/or a carrier material.

Preferably, the metal is selected from the group consisting of Cu, Fe, Ni, Co, and Mn, which metal is present in reduced metal form or oxidized derivate state, whereas the carrier material is preferably selected from the group consisting of alumina, silica, zirconia, and titania.

Preferably, the $CO_2$ production occurs when photosynthesis takes place in the enclosed space. Generally, this will be during the day or in the evening when assimilation lighting is used.

Preferably, the enclosed space is a greenhouse, as used, for instance, in horticulture under glass.

Preferably, the single reactor or separate reactors that contain the one or more beds are located within the enclosed space itself or in a space located nearby, for instance, an adjoining space.

Suitably, the heat released during the oxidation of the particles is (partly) stored in the particle bed of the reactor before it is used to drive the formation of $CO_2$ during the chemically reduction of the oxidised particles when the hydrocarbon-containing gas is passed over the bed of the oxidised particles. For this purpose the heat capacity of the metallic particle bed is in general sufficient. Likewise, oxygen bound by the bed can be stored by means of increasing the oxidation level of the particle bed. The amounts of heat and oxygen stored in the particle bed represent a $CO_2$ production potential, which on demand can be released through injection of a hydrocarbon gas. The reactor then functions as an integrated heat and $CO_2$ buffer which can store heat and $CO_2$ for days, and when appropriately sized even for weeks or months. Alternatively $CO_2$ produced can be stored before it is passed to the enclosed space. For this purpose, for instance, a pressurized gas buffer can be used. From such pressurized gas buffer CO2 can subsequently be released when the demand for $CO_2$ has increased within the enclosed space. Alternatively, $CO_2$ can be supplied from a pressurized gas buffer to an external consumer.

In an attractive embodiment of the present invention, the oxygen depleted air, after having been passed over the bed of particles, is subsequently used for drying, sterilising, pasteurising or debugging plants or food products, especially oxygen sensitive products, under oxygen free conditions, or packaging oxidation-sensitive or perishable products.

In another attractive embodiment of the present invention, at least part of the $CO_2$ formed during the chemical reduction of the particles is used for carbonating or debugging food products or packaging products under oxygen-free conditions.

The plants and/or crops in accordance with the present invention include all those that one usually grows in greenhouses.

The invention claimed is:

1. A method for regulating the heat and the $CO_2$ concentration of the air in an enclosed space within which plants or crops are grown, in which method an oxygen-containing gas and a hydrocarbon-containing gas are alternately passed over a bed of particles that are capable of binding oxygen, wherein the oxygen-containing gas is passed over the bed of particles at a temperature of 100 to 1,500° C. and a pressure in a range of 1 to 100 bar whereby the particles are oxidised and heat is released, after which at least part of the heat is provided to the enclosed space, and wherein the hydrocarbon-containing gas is passed over the bed of the oxidised particles at a temperature of 300 to 1,500° C. and a pressure of 1 to 100 bar whereby the oxidised particles are chemically reduced and water and $CO_2$ are formed, after which at least part of the $CO_2$ so obtained is provided to the enclosed space.

2. A method according claim 1, wherein the oxidation and reduction of the particles are carried out in a single reactor and the oxygen-containing gas and hydrocarbon-containing gas are alternately passed over the bed of particles.

3. A method according to claim 1, wherein the oxidation and reduction of the particles are carried out in separate reactors that each contain a bed of particles that are capable of binding oxygen and the oxygen-containing gas and hydrocarbon-containing gas are periodically switched for establishing oxidation and chemical reduction of the particles in each of the beds in the respective reactors.

4. A method according to claim 1, wherein porous ceramic or metal pipes are used to distribute the oxygen-containing gas and hydrocarbon-containing gas over the bed of particles at a low-pressure drop.

5. A method according to claim 1, wherein the hydrocarbon-containing gas comprises one or more gaseous hydrocarbons.

6. A method according to claim 5, wherein the hydrocarbon-containing gas comprises natural gas or methane.

7. A method according to claim 1, wherein the oxygen-containing gas comprises air.

8. A method according to claim 1, wherein the particles comprise a metal or a metal oxide or metal oxide and a carrier material.

9. A method according to claim 8, wherein the metal is selected from the group consisting of Cu, Fe, Ni, Co, and Mn, which metal is present in reduced metal form or oxidized derivate state.

10. A method according to claim 8, wherein the carrier material is selected from the group consisting of alumina, silica, zirconia, and titania.

11. A method according to claim 1, wherein the heat released during the oxidation of the particles is stored before it is used to drive the formation of $CO_2$ during the chemically reduction of the oxidised particles when the hydrocarbon-containing gas is passed over the bed of the oxidised particles.

12. A method according to claim 1, wherein the oxygen-containing gas, after having been passed over the bed of particles, is subsequently used for drying, sterilising, pasteurising or debugging plants or food products, or packaging oxidation-sensitive products.

13. A method according to claim 1, wherein at least part of the $CO_2$ formed during the chemical reduction of the particles is used for carbonating or debugging food products or packaging products under oxygen-free conditions.

* * * * *

UNITED STATES PATENT AND TRADEMARK OFFICE
CERTIFICATE OF CORRECTION

PATENT NO. : 7,921,596 B2  
APPLICATION NO. : 11/920363  
DATED : April 12, 2011  
INVENTOR(S) : Feron et al.

Page 1 of 1

It is certified that error appears in the above-identified patent and that said Letters Patent is hereby corrected as shown below:

On title page delete Item (75) and insert

Item --(75) Inventors: Paul Hubert Maria Feron, Apeldoorn (NL);

Nick Antonius Maria Asbroek, Winterswijk (NL)--

Signed and Sealed this
Twentieth Day of September, 2011

David J. Kappos
*Director of the United States Patent and Trademark Office*